Patented Apr. 7, 1942

2,278,970

UNITED STATES PATENT OFFICE 2,278,970

MICA CONTAINING PIGMENT AND METHOD OF MAKING THE SAME

Francis Clarke Atwood, Newton, Mass., assignor to Atlantic Research Associates, Inc., Newtonville, Mass., a corporation of Delaware No Drawing. Application January 23, 1940, Serial No. 315,275

22 Claims. (Cl. 106—148)

This invention relates to improvements in coating compositions, and has particular reference to mica containing pigments for use in such compositions and to the method of producing the same.

Coating compositions containing a pigment in flake or leaf form, as contrasted with the conventional powdered form, are highly desirable. The overlapping of the flake particles in a paint, to obtain a characteristic "leafing" or "bridging" action, results in a protective coating having many advantages from the viewpoint of both utility and appearance. At the present time, metallic flakes such as aluminum or bronze flakes, are used for this purpose, as this type of flake is easily oriented with its plane of greatest cross-section parallel to the coated surface to achieve the maximum in protective coating. The high cost of metal flake pigments and the decidedly metallic luster they produce in the paint film has emphasized the desirability of a non-metallic pigment having a similar desirable leafing action, but not possessing these disadvantages. Even though the luster of the metallic flake paints is not objectionable, it is desirable to lower the cost of the paint by incorporating a non-metallic flake pigment filler or diluent that does not detract from the desired properties of the metallic leaf pigments.

In order to be certain as to the terminology used, I refer to the more conventional pigments such as lead, zinc, antimony and titanium pigments as non-metallic or powdered pigments, and to the aluminum and bronze pigments as metallic flake pigments.

The use of ground mica as a pigment or diluent heretofore has been proposed but has failed to produce the result achieved with either the powdered or metallic flake pigments, particularly with reference to the durability of the film, and the smoothness of grain upon application. Only with the use of comparatively thick and large size mica flakes has satisfactory leafing of the pigment on the coated surface been obtained, and the film then is characterized by uneven texture and a sparkling quality. The latter is particularly undesirable for many purposes and is attributable to the large size and shape of the particles. Finely ground mica particles, as contrasted with the mica flakes, when an ingredient of paint, tend to roll under the stroke of the paint brush to form undesirable accumulations of pigment on the coated surface. If they are too finely ground they have no more effect than an ordinary powdered filler. Such ground mica obtains a minimum of the desired leafing action in the paint film.

Dilution of metallic flake pigments, or the conventional powdered pigments, with mica fillers of the types heretofore available have resulted in depreciating the desired qualities of the coating produced when the paint is applied to a surface. For example, the film produced by the metal flake containing such micas has possessed markedly less smoothness, brightness and durability than that obtained with a pure metal flake pigment, and the commercial value of such a mica and metal flake pigment has been of small import. The film produced from ordinary powdered pigments containing such mica similarly has also been inferior in appearance and utility.

Accordingly, it is an object of the present invention to provide a novel pigment composition for use in paints, which exhibits superior covering and surface hiding qualities and which imparts a maximum durability, strength and utility to paint films embodying use of the said pigment.

I have discovered that mica may be produced in flakes of such dimensions and contour and having such surface characteristics as to render it highly desirable as a pigment by itself, or as an ingredient of a paint film and a pigment, both of the metallic flake type and the conventional powdered pigment type.

A further object is to provide a pigment which upon application to a surface is characterized by a leafing action similar to the leafing action of the high-grade metallic flake pigments.

A further object is to provide a pigment containing mica flakes which, when applied to a surface, produces a smooth film of fine texture and possessing maximum light reflecting qualities, but free from undesirable sparkling.

A further object is to provide a pigment both of the metallic flake type and powdered type, containing mica flakes to form a composite pigment exhibiting qualities of durability and reflective powers equivalent or superior to those of a paint film embodying only metallic flake pigment or powdered pigments or combinations thereof.

Still a further object is to provide a novel method for the economical manufacture of the pigment composition comprising the invention.

Other objects and advantages will be apparent to one skilled in the art from the following description of the invention.

The mica particles used as an ingredient of the pigment are characterized by a retention of their laminar structure so as to possess a flake or leaf-like conformation which greatly enhances the spreading and hiding properties as well as the stability of a paint film containing the said pigment.

To obtain the desired leafing or bridging action of the mica particles which contributes to the durability and desirable appearance of the paint film in which they are embodied, the mica flakes should be materially less in thickness than in length, a substantial to major portion of the flakes having a thickness of less than 1 micron and at least 90% having a thickness of not over 2 microns. In area at least 90% should pass a 325 mesh sieve and have a diameter of less than 50 microns across their face, and should have a minimum diameter of 5 microns across their face. The flakes should be at least approximately 10 times and preferably 20 times as wide as they are thick, and may be as high as 100 times as wide as thick. Further, it is desirable, although not essential, that the flakes be thinner at their edges than at the center portion, thus presenting faces substantially convex in formation. This character of the flake permits the ready overlapping of the flakes as distinguished from flakes with thick edges that become "dog eared" and render overlapping impossible. It has been found that a flake conforming to the above dimensions readily assumes a flat position on the surface to be covered upon application of the paint embodying the pigment by brushing or spraying, obtaining a smooth surface film of superior grain and free from undesirable flow tendencies as the film dries on the painted surface.

While any mica which will delaminate satisfactorily to form particles retaining the flake formation above described may be used, it is preferred to use a mica of the muscovite type such as Indian Mica for the purposes of the invention, the said mica being softer and exhibiting superior qualities of delamination than other commonly used types of micas.

The mica flakes having the above described dimensions may also advantageously possess a surface coating of material such as a deflocculating agent or wetting agent or other materials such as a soap or sulphur. In general they have a preferred pH range of 7 to 9.

Mica flakes of the type referred to may be produced in accordance with the process described in my application Serial No. 307,183 filed December 1, 1939.

Mica flakes of the character described readily orient upon brushing to provide an overlapping or leafing action which greatly increases the covering qualities of the paint in which the mica is employed.

Any desired characteristics of body and color may be imparted to the new pigment by intimately mixing the mica with known coloring materials, diluents or fillers. The mica pigment is equally adaptable for use in water, oil, lacquer or any other film forming vehicle, any preference depending upon the particular characteristics of reflectivity and weather resistance desired in the paint film.

The film durability and covering capacity of commonly used powdered pigments, particularly those known as "high index" pigments may be substantially increased by adding to the said pigments varying amounts of finely divided mica flakes having a particle thickness and size described heretofore and possessing the physical characteristics above referred to. The actual hiding power of such pigments in water, oil, lacquer, and other suspending vehicles is greatly increased by the addition of the mica thereto in an amount approximating from 5 to 30% of the pigment. For example, use of the mica of the invention as a filler in casein or stipple paints obtains particularly desirable results in minimizing chipping and abrasion of the paint film, and tends to control the powdering of the paint upon exposure to adverse weather conditions.

While the theory by which the improved covering qualities of the composite pigment of the mica and pigment and of a paint embodying the same is not definitely understood, it is believed that the surfaces of the mica are sufficiently separated by the pigment particles so that the mica flakes act as reflecting surfaces in a very thin layer of paint, thus diminishing the amount of light absorbed by and transmitted into the body of the paint and increasing the light reflected by the paint film. The reflection of the mica flake constituent of the paint film will not be as pronounced when the composite pigment is suspended in an oil and certain lacquer vehicles as when the pigment is used in a water paint, because of the closeness in refractive index of the mica and these oil and lacquer vehicles, and also because a small layer of these vehicles will absorb an appreciable quantity of light. On the other hand, when the composite pigment is carried in a water vehicle, such as a casein paint, the multiple reflection effect of the mica flake layer is particularly pronounced. The reflection referred to is desirable and is to be distinguished from the undesirable sparkling effect generally associated with mica, because of the particle size and shape of the mica flakes used in the pigments of this invention.

The use of the mica flake pigment of this invention as an inert or extending pigment in coating compositions comprising a high covering pigment base is particularly desirable because the leafing action of the mica within the vehicle acts to prevent an undesirable absorption of the vehicle and pigment by the surface being coated. While sufficient of the vehicle is allowed to attach itself to the surface to insure the permanency of the paint film, the flakes of mica act as valves to cover up the suction pores in the said surface thereby preventing excessive penetration of the surface by the vehicle. Previous attempts to obtain this effect have depended upon a thickening action of the vehicle itself to prevent undue absorption, with consequent loss in adhesion of the paint film to the surface.

A further effect closely allied to this is the bridging action of these mica flakes to cover and seal relatively porous surfaces and so allow imperfections in the surface to be coated to be readily and to be easily covered up with a minimum number of coatings. Again, the use of mica substantially strengthens the paint film and overcomes many of the defects normally met with as the paint film dries out, ages and contracts. The use of mica appears to prevent the breakdown of the paint film with consequent destruction of the protective action for which this paint is frequently utilized.

In the description of my invention heretofore, it is contemplated that the mica flakes will be mixed with the other pigment ingredients of the composite pigments either in the dry form or in the paint vehicle.

Admixture of the mica flakes with the pigment may also be carried out by precipitating the pigment directly onto the mica flake, thereafter drying or heating and calcining the composite mixture to produce a homogeneous synthetic pigment of mica and pigment. Other methods of coating the mica with pigment may be employed, for instance, the mica may be incorporated directly into the paint comprising a pigment suspended in a suitable vehicle, or a dried coloring pigment may be mixed intimately with the mica flakes, and preserved in this dry form until desired for use.

As a further embodiment of the invention, it has been discovered that the finely divided mica flakes having the aforedescribed formation contribute appreciably to the hiding and covering values of high index pigments, such as titanium dioxide pigments, which are used in all the types of paints and particularly in water paints. The mica particles appear to act as pigment dispersing agents, small particles of titanium dioxide pigment adhering tightly to the convex surfaces of the mica flakes. Particular advantage may be taken of this unusually effective dispersing characteristic by drying down the titanium dioxide particles in contact with the mica flakes, whereby the mica assumes an opaque cast, exhibiting an extreme intimacy in the mixture of the composite pigment.

A further improvement in the pigment texture may be obtained by coating the mica flakes with a film or sheath of a gelatinous or adhesive material before precipitating or drying the titanium dioxide particles thereon, the said sheath serving to bind more adequately the titanium dioxide particles to the mica. The coating also enhances the opacity of the mica particles upon the adherence of the pigment to the flakes. Lead phthalate lends itself admirably to the purposes set forth, retaining a maximum of its gelatinous character upon drying on the mica flakes, to bind the particles of titanium dioxide very tightly on the flakes.

As an example of a preferred process for preparing this composite pigment, a quantity of the mica flakes may be dispersed in water solution and the desired amount of titanium dioxide intimately mixed therewith. Phthalic acid is then added to the solution which is heated. Lead acetate may then be slowly added to the hot solution, allowing the lead phthalate precipitate so formed to coalesce with the mica and the titanium dioxide. After the reactions in precipitation and coagulation have gone to completion, the composite pigment is washed to free it from any excess of lead acetate or other soluble lead salts. The final precipitated pigment may then be thoroughly dried and stored until use.

Other adhesive materials may be used in the place of lead phthalate, for instance, lead borate, the latter also acting to flux the pigment with the mica particles upon application of high temperatures to the composite pigment. Other high index pigments such as zinc sulfide, and antimony oxide may be used in the place of titanium dioxide, the latter acting with the mica to form a more intimately mixed composite pigment than the aforementioned pigments.

It is preferred to utilize the mica and titanium dioxide constituents in the proportions of 2 parts by weight of mica flakes and ½ to 1½ parts of titanium dioxide; a proportion from 10 to 20% by weight of lead phthalate is sufficient to bind the titanium to the mica when used in the above proportions.

It has been discovered that mica flakes as described herein are particularly suitable for use as an inert filler in combination with a metal flake pigment, such as aluminum. In such a composite pigment, the cost of the metallic pigment paints is reduced and their covering qualities extended, while at the same time their desired characteristics of durability and high reflective indices are retained. Further, the minute mica particles tend to support the more flexible metal flakes, which ordinarily tend to roll up on the coated surface under brushing to form an unevenly distributed film. This supporting characteristic increases the leafing or bridging action of the metal flake pigments, and permits the use of finer grades of metal flake in surfacing compositions, contrasting with the present practice of utilizing metal flakes of a minimum thickness of 3 or 4 microns. A coating film of greater durability, smoother grain, and finer luster or sheen is obtained, than when a pigment solely of metal flake pigment is used.

Incorporation of the mica flakes into the aluminum flake pigment may be effected by the usual practices now employed for mixing pigments. Better results are obtained, however, when the mica is wetted and mixed into a metal-flake paste, the paste being rolled or otherwise intimately mixed with the mica flakes, care being taken that the mixing be accomplished in a manner retaining the laminar structure of the flakes.

It is believed that the improved metallic film produced upon the drying of a paint with the composite pigment results in part from proportioning the aluminum and mica flakes within the preferable range of from 30 to 70% by weight of either the aluminum flake or the thin mica flake. Of course, any amount of either pigment may be used to advantage, but the optimum results appear to be obtained from proportions in this range. Within this range there is sufficient aluminum flake to completely cover all of the mica surface produced on the surface to be coated when the composition is brushed out, there being, at the same time, sufficient mica to completely cover the said surface. As a result of the overlapping or leafing qualities of the mica flakes, a highly effective base is provided for the reception of the aluminum flakes thereon, resulting in the production of an evenly distributed, smooth, light reflecting metallic surface of exceptional durability.

While the mica flake pigment is particularly suitable for use as a diluent of aluminum paints it may be employed with equally desirable results with bronze, lead, zinc, copper, tin and other commonly used metal-flake pigments.

A desirable advantage obtained by the use of the mica flake pigment of the invention in combination with paint pigment is also obtained when the mica is used with metallic pigments and lies in the ability of the mica flakes to cover and seal relatively porous surfaces, and to bridge imperfections in the surface to be coated so as to allow the said imperfections to be easily covered. The better dispersing qualities of the pigment tend to eliminate voids in the coated surface, and decrease the amount of working of the paint necessary to obtain proper dispersion of the film over the surface.

Further, the use of mica having the characteristics above described substantially strengthens the paint film, thus tending to overcome the defects normally experienced with conventional paints such as blistering under excessive heat, contraction, and scaling of the film upon drying out. The use of mica as an extending and supporting agent increases the covering qualities of paint without sacrificing the quality of the film produced, thus effecting substantial savings in painting costs. The film exhibits high resistance to wear and abrasion; the mica content of the film also protects the metal leaf from tarnish and corrosion, and reduces the undesirable reaction of the metal flake with the vehicle.

I am aware of the fact that mica is generally known as an undesirable filler or adulterant for use with aluminum leaf pigments and that numerous attempts have been made to dilute the expensive metallic leaf with much cheaper mica, but without success.

In accordance with my invention, however, I am enabled to produce not only a satisfactory and highly desirable mica-metallic flake mixture, but one which has substantial advantages over pigments composed solely of metal leaf. These advantages, as mentioned heretofore, include better sheen and dispersion, less roughness and fewer voids in the surface, better covering of rough and porous surfaces, less cracking of the film, greater wear and abrasive resistance of the finished film, easier brushing, and protection of the metal leaf against corrosion, tarnish and reaction with the paint vehicle.

In addition to the proportions mentioned above, I attribute these results at least in part to the selection of the mica particles. The character of the mica particles has been mentioned briefly heretofore and more specifically in my application Serial No. 307,183, filed December 1, 1939. These particles are the result of grinding or comminuting in such a way that the mica is delaminated more than it is ground or chopped in pieces. The particles are less in thickness than the metal leaf and preferably not over 2 microns thick. The mica particles have a smooth, outer edge and present convex faces to the vehicle and to the metal flake. The particles also are thinner at their edges than in the center of the flake. The mica flakes should be approximately, and on the average, at least 10 times and preferably 20 times wider on their face than they are thick, and these dimensions can extend up to 100 times wider. Because of these dimensions, the paint will lay flat and smooth out easily when brushed to form a support for the very flexible metallic leaf which otherwise would roll up under the brushing. Inclusion of this mica in the pigment will also allow the use of finer grades of aluminum flake than is now possible. A substantial benefit is also obtained because the mica particles have been treated so that the pH value of their surfaces has been adjusted to a higher value than that of mica existing in nature. This may be accomplished in connection with a coating of the flakes with a wetting or dispersing agent, preferably of an organic nature. As a result, the mixture of the mica and metal leaf shows not only excellent leafing and brushing qualities, but a lower vehicle requirement for a desired consistency.

While the preferred embodiment of the present invention has been herein described, it will be understood that the invention anticipates the use of equivalents where possible, and that the invention is to be limited only by the scope of the following claims.

This application is a continuation in part of application Serial No. 42,273, filed September 26, 1935.

I claim:

1. A composite pigment for use as an ingredient of a coating composition comprising a pigment and a substantial proportion of mica intimately associated with the pigment, said mica comprising flakes at least 90% of which are not over 2 microns in thickness.

2. A coating composition comprising a water paint made with a casein vehicle, a pigment, and a substantial portion of finely divided mica intimately associated with the said pigment, said mica comprising flakes at least 90% of which are not over 2 microns in thickness.

3. A composite pigment for use as an ingredient of a coating composition comprising a pigment, and a substantial portion of mica intimately associated with the pigment, the said mica comprising from 5 to 30% of the composite pigment, and comprising flakes at least 90% of which have a thickness of not over 2 microns.

4. A composite pigment for use as an ingredient of a coating composition capable of producing a paint film, comprising a pigment and a substantial proportion of mica particles intimately associated with the pigment, the said particles having a thinness ratio of at least 10 and being adapted to lie with the plane of greater cross section parallel to the surface plane of the said paint film, at least 90% of said particles having a thickness of less than 2 microns and passing a 325 mesh sieve.

5. A composite pigment for use as an ingredient of a coating composition comprising finely divided mica flakes, at least 90% of which are not over 2 microns in thickness, and a pigment deposited upon the surfaces of said mica flakes.

6. A composite pigment for use as an ingredient of a coating composition capable of producing a paint film, comprising a substantial proportion of mica flakes and a pigment deposited on and adhering to the surface of said flakes, the said particles having a thinness ratio of at least 10 and being adapted to lie with the plane of greater cross section parallel to the surface plane of the said paint film, at least 90% of said particles having a thickness of less than 2 microns and passing a 325 mesh sieve.

7. A synthetic pigment composition comprising titanium dioxide intimately associated with mica flakes, at least 90% of which have a thickness of 2 microns or less, said ingredients being in the proportions of 2 parts by weight of mica flakes to ½ to 1½ parts by weight of titanium dioxide.

8. A synthetic pigment comprising mica flakes at least 90% of which have a thickness of 2 microns or less and pass a 325 mesh sieve, an adhesive material upon the surface of the mica flakes, and a high index pigment adhering to the surface of the mica flakes, the above constituents being present in the proportions of 2 parts by weight of mica flakes, to ½ to 1½ parts by weight of high index pigment, and from 10 to 25% by weight of the adhesive composition.

9. A composite pigment for use as an ingredient of a coating composition comprising a pigment having intimately associated therewith a substantial proportion of mica flakes, at least 90% of which have a maximum thickness of 2 microns, the said flakes being coated with an organic deflocculating agent.

10. A composite pigment for use as an ingredient of a coating composition comprising a pigment having intimately associated therewith a substantial proportion of mica flakes, at least 90% of which have a maximum thickness of 2 microns, the surface portions of the said flakes being treated to have a pH value within the range of 7 to 9.

11. A composite pigment for use as an ingredient of a coating composition comprising a metallic flake pigment and a substantial proportion of mica flakes, at least 90% of which have a maximum thickness of 2 microns, intimately associated with the said metallic flake pigment.

12. A composite pigment for use as an ingredient of a coating composition comprising a finely divided aluminum flake pigment intimately associated with mica flakes, at least 90% of which have a thickness of 2 microns or less and pass a 325 mesh sieve.

13. A composite pigment for use as an ingredient of a coating composition comprising from 30 to 70% by weight of finely divided metallic flakes intimately associated with from 70 to 30% by weight of mica flakes at least 90% of which have a thickness of 2 microns or less.

14. A composite pigment for use as an ingredient of a coating composition comprising from 40 to 60% by weight of a finely divided aluminum flake pigment intimately associated with from 60 to 40% by weight of mica flakes, at least 90% of which have a thickness of 2 microns or less and have a diameter-thinness ratio of at least 10.

15. The method of making a composite pigment for use as an ingredient of a coating composition comprising the steps of securing a pigment onto finely divided mica flakes, at least 90% of which have a maximum thickness of 2 microns, to produce a coating composition possessing superior covering characteristics.

16. The method of making a composite pigment for use as an ingredient of a coating composition comprising the steps of coating finely divided mica flakes with a surface modifying agent, and intimately associating the thus coated flakes with a finely divided pigment, at least 90% of said mica flakes having a thickness of not over two microns, whereby a coating composition having superior leafing properties is produced.

17. A composite pigment for use as an ingredient of a coating composition comprising a pigment and a substantial proportion of mica intimately associated with the pigment, said mica comprising flakes at least 90% of which are not over 2 microns in thickness and have a diameter within the range of 5 to 50 microns.

18. A composite pigment for use as an ingredient of a coating composition comprising a pigment and a substantial proportion of mica intimately associated with the pigment, said mica comprising flakes at least 90% of which are not over 2 microns in thickness, have a diameter within the range of 5 to 50 microns and a diameter-thinness ratio of at least 10.

19. A composite pigment for use as an ingredient of a coating composition comprising a zinc sulfide pigment and a substantial proportion of mica intimately associated with said pigment, said mica comprising flakes at least 90% of which are not over 2 microns in thickness, and have a diameter within the range of 5 to 50 microns.

20. A composition characterized by its porosity bridging, controlled penetration, and film-forming ability when used as a film-forming material, comprising a water-insoluble film-forming vehicle and a substantial portion of finely divided mica flakes at least 90% of which are not over two microns in thickness.

21. A composition characterized by its porosity bridging, controlled penetration and film-forming ability when used as a film-forming material, comprising a water-insoluble film-forming vehicle, a pigment, and a substantial portion of finely divided mica flakes at least 90% of which are not over two microns in thickness, and have a diameter-thinness ratio of at least 10.

22. A composition characterized by its porosity bridging, controlled penetration and film-forming ability when used as a film-forming material, comprising a water-insoluble film-forming vehicle, a zinc sulfide pigment, and a substantial portion of finely divided mica flakes at least 90% of which are not over two microns in thickness.

FRANCIS CLARKE ATWOOD.